(12) United States Patent
Ross et al.

(10) Patent No.: US 7,209,714 B2
(45) Date of Patent: Apr. 24, 2007

(54) APPARATUS, AND ASSOCIATED METHOD, FOR COMMUNICATING DATA AT SELECTED LEVELS OF DIVERSITY IN A RADIO COMMUNICATION SYSTEM

(75) Inventors: John Anderson Fergus Ross, Del Mar, CA (US); Thomas J. Kenney, San Diego, CA (US)

(73) Assignee: Nokia Corporation, Espoo (FI)

( * ) Notice: Subject to any disclaimer, the term of this patent is extended or adjusted under 35 U.S.C. 154(b) by 70 days.

(21) Appl. No.: 10/651,837

(22) Filed: Aug. 29, 2003

(65) Prior Publication Data

US 2005/0048942 A1    Mar. 3, 2005

(51) Int. Cl.
H03C 7/02 (2006.01)
H04B 7/02 (2006.01)

(52) U.S. Cl. .................. 455/101; 455/103; 375/299

(58) Field of Classification Search ........... 455/101, 455/102, 103, 132, 133, 137, 272, 273, 277.1; 375/347, 299; 714/755, 790
See application file for complete search history.

(56) References Cited

U.S. PATENT DOCUMENTS

| | | | |
|---|---|---|---|
| 5,848,103 A * | 12/1998 | Weerackody | 375/295 |
| 6,487,693 B1 * | 11/2002 | Kim et al. | 714/786 |
| 6,516,441 B1 * | 2/2003 | Kim et al. | 714/774 |
| 6,560,748 B2 * | 5/2003 | Li | 714/786 |
| 6,771,705 B2 * | 8/2004 | Kenney et al. | 375/267 |
| 2002/0166093 A1 * | 11/2002 | Eroz et al. | 714/755 |
| 2003/0101407 A1 * | 5/2003 | Ariel et al. | 714/774 |

FOREIGN PATENT DOCUMENTS

| | | | |
|---|---|---|---|
| JP | 02001251199 A | * | 9/2001 |
| WO | WO 01/29986 A1 | * | 4/2001 |
| WO | WO 02/43314 A1 | * | 5/2002 |

* cited by examiner

Primary Examiner—Nguyen T. Vo
(74) Attorney, Agent, or Firm—Banner & Witcoff, Ltd.

(57) ABSTRACT

Apparatus, and an associated method, for selectably introducing desired levels of diversity into data communicated upon a radio communication channel to effectuate a communication service, such as a 1×EV-DV communication service. Responsive to channel conditions, the level of diversity is selected, and levels of encoding are utilized. Matching encoder and decoder apparatus are provided to sending and receiving station pairs. Encoder apparatus includes constituent encoder elements, and associated interleaver elements for interleaving data that is to be communicated by associated encoder elements. One, or more, antenna transducer elements are selectably utilized to provide spatial diversity in addition to temporal diversity.

18 Claims, 4 Drawing Sheets

APPARATUS, AND ASSOCIATED METHOD, FOR COMMUNICATING DATA AT SELECTED LEVELS OF DIVERSITY IN A RADIO COMMUNICATION SYSTEM

The present invention relates generally to a manner by which to facilitate successful communication of data in a communication system, such as a cellular radio communication system that provides for high speed data communications. More particularly, the present invention relates to apparatus, and an associated method, for selectably operating upon data that is to be communicated by a sending station to a receiving station upon a channel susceptible to fading, or other distortion. The data is operated upon, selectably to increase its diversity when channel conditions are poor. Channel encoder apparatus is provided for the sending station, and a corresponding channel decoder is provided for the receiving station. The amount of diversity to be used is dynamically selected, and the diversity is provided without assuming uncorrelation of communication paths formed between the sending and receiving

BACKGROUND OF THE INVENTION

A communication system operates to provide for the communication of data between communication stations positioned at spaced-apart locations. At least one of the communication stations forms a sending station, and at least another of the communication stations forms a receiving station. A communication channel interconnects the sending and receiving stations. Data is communicated by a sending station to a receiving station by way of the communication channel.

Various types of communication systems have been developed and deployed, capable of effectuating different types of communication services. As a result of technological advancements, new types of communication systems have been developed and deployed. With continued technological advancements, additional types of communication systems shall likely be developed and deployed, providing improved and new communication services that can be effectuated.

A radio communication system is an exemplary type of communication system. Various types of radio communication systems have been developed and deployed, permitting the effectuation of many types of communication services. Radio communication systems utilize communication channels that are defined upon radio links formed between sending and receiving stations. The need otherwise to utilize wireline connections along the entire paths between the sending and receiving stations is obviated. That is to say, at least for the portion of the path that utilizes radio communication channels defined upon a radio link, the need for a wireline connection is obviated.

Use of a radio communication system by which to communicate provides various advantages. For instance, the costs required initially to deploy a radio communication system are generally less than the costs required to deploy a corresponding wireline communication system. That is to say, the infrastructure costs associated with a radio communication system are generally less than the infrastructure costs associated with a corresponding wireline communication system. Additionally, a radio communication system is amenable for implementation as a mobile communication system in which communication mobility is provided to one or more of the communication stations operable in the communication system.

Many radio, as well as other, communication systems make use of digital communication techniques. And, many of the technological advancements that have been implemented in communication systems pertain to digital communication techniques or provide for the communication of the data in digital form. When digital communication techniques are used, data that is to be communicated is first placed into digitized form. And, then, typically, the digitized data is formatted into data packets or frames according to a selected data formatting scheme. The data is communicated by sending the packets or frames between the sending and receiving stations. Because of the formatting of the data into packets or frames, the packets or frames can be communicated individually or in discrete groups. And, when delivered to the receiving station, the informational content of the data is recovered by determining the values of the data contained in the packets or frames.

Ideally, the data is communicated upon distortion-free channels so that the values of the data, when received at a receiving station, are in identical correspondence with the values of the data when communicated by a sending station upon a radio channel. However, in an actual system, fading, or other distortion-causing conditions distort the data during its communication upon the channel to the receiving station. If the values differ significantly, the informational content of the data can not be recreated at the receiving station. Fading conditions, also know as multipath conditions, alter the values of the values of the data, or portions thereof, such that, when detected at the receiving station, the values of the data differ with corresponding values when sent by the sending station.

Compensation for the distortion caused by fading is attempted by various techniques. For instance, the diversity of the data is sometimes increased to increase the likelihood that the informational content of the data is recovered at the receiving station.

One type of diversity is time diversity that is introduced into the data that is communicated by a sending station. By utilizing time diversity, time redundancy is introduced into the data. By introducing time redundancy, loss of portions of the data during its communication upon a channel susceptible to fading is less likely to prevent recovery of the informational content of the data. The time diversity takes advantage of the time variance typically associated with fading. That is to say, the amount of fading varies as a function of time, and the time diversity introduced into the data that is communicated upon such a channel increases the likelihood that some part of the redundant data is delivered to a receiving station.

Space diversity is sometimes also utilized. In space diversity, a sending station uses two or more transmit antennas from which to transmit data that is communicated to a receiving station. The transmit antennas are spaced apart by separation distances, thereby to cause the data that is communicated by the respective ones of the transmit antennas to be communicated upon differing communication paths to the receiving station. Through appropriate selection of the separation distances, the correlation between the data is potentially reduced. Systems that utilize multiple transmit antennas are sometimes referred to as being multiple output systems. Spatial, and sometimes also polarization, diversity is provided in systems that utilize multiple transmit antennas.

As the data rates, and corresponding amounts of data, that must be communicated to effectuate many new, and pro posed communication services increases, the need to utilize multiple output communication systems shall also become increasingly necessary due to the increased throughput capabilities of the multiple output systems. As data shall need to be communicated upon channels that are susceptible to fading, or other distortion-causing conditions, there shall be a continuing need to utilize diversity in the communication of the data.

If an improved manner could be provided by which selectably to increase, or otherwise alter, the amount of diversity introduced upon data that is to be communicated, depending upon communication conditions, improved communications would be possible.

It is in light of this background information related to the communication of data in a communication system susceptible to fading, or other distortion-causing conditions, that the significant improvements of the present invention have evolved.

SUMMARY OF THE INVENTION

The present invention, accordingly, advantageously provides apparatus, and an associated method, for facilitating successful communication of data in a communication system, such as a cellular radio communication system that provides for high speed data communications.

Through operation of an embodiment of the present invention, a manner is provided by which selectably to operate upon data that is to be communicated by a sending station to a receiving station upon a channel susceptible to fading or other distortion. The data is caused to be operated upon in manners selectably to alter the level of diversity of the data that is communicated during operation of the communication system. When channel conditions are poor, the level of diversity caused to be introduced into the data is increased. And, when the channel conditions are good, the level of diversity is decreased.

Channel encoder apparatus is provided for a sending station by which to channel encode data that is to be communicated by the sending station to a receiving station. The channel encoder selectably operates to create time diversity in the data that is to be communicated by the sending station. Responsive to indications of the channel conditions, the level of diversity is selectably increased, decreased, or unchanged.

Corresponding channel decoding apparatus is provided for the receiving station. The decoding apparatus operates analogous to, but reverse to that of, the channel encoder apparatus, embodied at a sending station that sends the data to the receiving station. When increased levels of diversity are included in the transmitted data, the channel decoder apparatus embodied at the receiving station correspondingly acts upon the data to channel decode the transmitted data, transmitted with the increased levels of diversity.

In one aspect of the present invention, multiple encoder elements are used, separately to encode representations of the data that are to be communicated by the sending station. The number of encoders that are selected to be used is dependent upon the channel conditions of the channel upon which the data is to be communicated. When channel conditions are poor, increased numbers of encoders are utilized. And, when channel conditions are good, decreased numbers of encoders are utilized.

In another aspect of the present invention, the representations of the data that are encoded by the separate encoding elements are interleaved so that at least selected ones of the encoder elements encode interleaved representations of the data. The level of interleaving of the representations of the data differs, depending upon to which of the encoder elements that the interleaved data is to be applied. Successive ones of the encoder elements are adapted to receive successively greater interleaved representations of the data. In one implementation, an interleaver element is associated with each encoder element, adapted to receive the representations of the data, in unencoded form. Each separate interleaver operates to interleave, in different manners, the representations of the data provided thereto. Thereby, the interleaved data provided by the separate interleaver elements to associated encoder elements differ. In another implementation, the interleaver elements are cascaded. That is to say, the separate interleaver elements are positioned such that successive ones of the interleaver elements are coupled to receive interleaved values formed by another interleaver element, and the interleaving performed by individual ones of the interleaver elements increase the level of interleaving, incrementally also to provide each associated encoder element with separate interleaved values that are to be encoded.

In another aspect of the present invention, encoded representations formed by the individual encoder elements are selectably multiplexed together and selectably applied to one or more transmit antenna transducers. Selection is further made as to how many transmit antennas to utilize and to which antenna transducer to apply the encoded representations. Use of more than one transmit antenna transducer increases the diversity of the transmitted data by adding spatial diversity. Selecting how many antenna transducers to utilize and to which antenna transducer to apply encoded data provides further manners by which to alter the diversity of the transmitted data.

Any of various levels of diversity are thereby introduced into data that is to be communicated by a sending station. Dynamic reselection of the level of diversity, in one implementation, in the event that the level of diversity that is required to communicate the data acceptably to a receiving station changes. By decreasing the level of diversity, the data throughput rate is decreased.

Decoder apparatus embodied at a receiving station is configured to operate the sending station. When increased levels of time diversity are introduced at the sending station, the decoding element correspondingly operates, and deinterleaving operations are performed. Thereafter, the informational content of the data is recovered.

In these and other aspects, therefore, apparatus, and an associated method, is provided for a radio communication system. Data is communicated during operation of the radio communication system by a sending station upon a channel susceptible to distortion to a receiving station. Successful communication of the data to the receiving station in a form that facilitates recreation of the informational content of the data is made. A first constituent encoder is adapted to receive values representative of the data to be communicated by the sending station to the receiving station. The first encoder encodes the values received thereat to form first encoded representations of the data. At least a first interleaver is adapted to receive the values representative of the data to be communicated by the sending station. The first interleaver interleaves the values received thereat to form at least first interleaved values. At least a second constituent encoder is adapted to receive the at least the first interleaved values formed by the at least the first interleaver. The second constituent encoder encodes the first interleaved values to form second encoded representations of the data. At least a first antenna transducer is adapted selectably to receive a selected one of the first encoded representation of the data and the at least the second representation of the data.

Selection of which, and how many, of the first and at least second representations of the data to which the at least the first antenna transducer is selected to receive is responsive to communication conditions of the channel susceptible to distortion.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
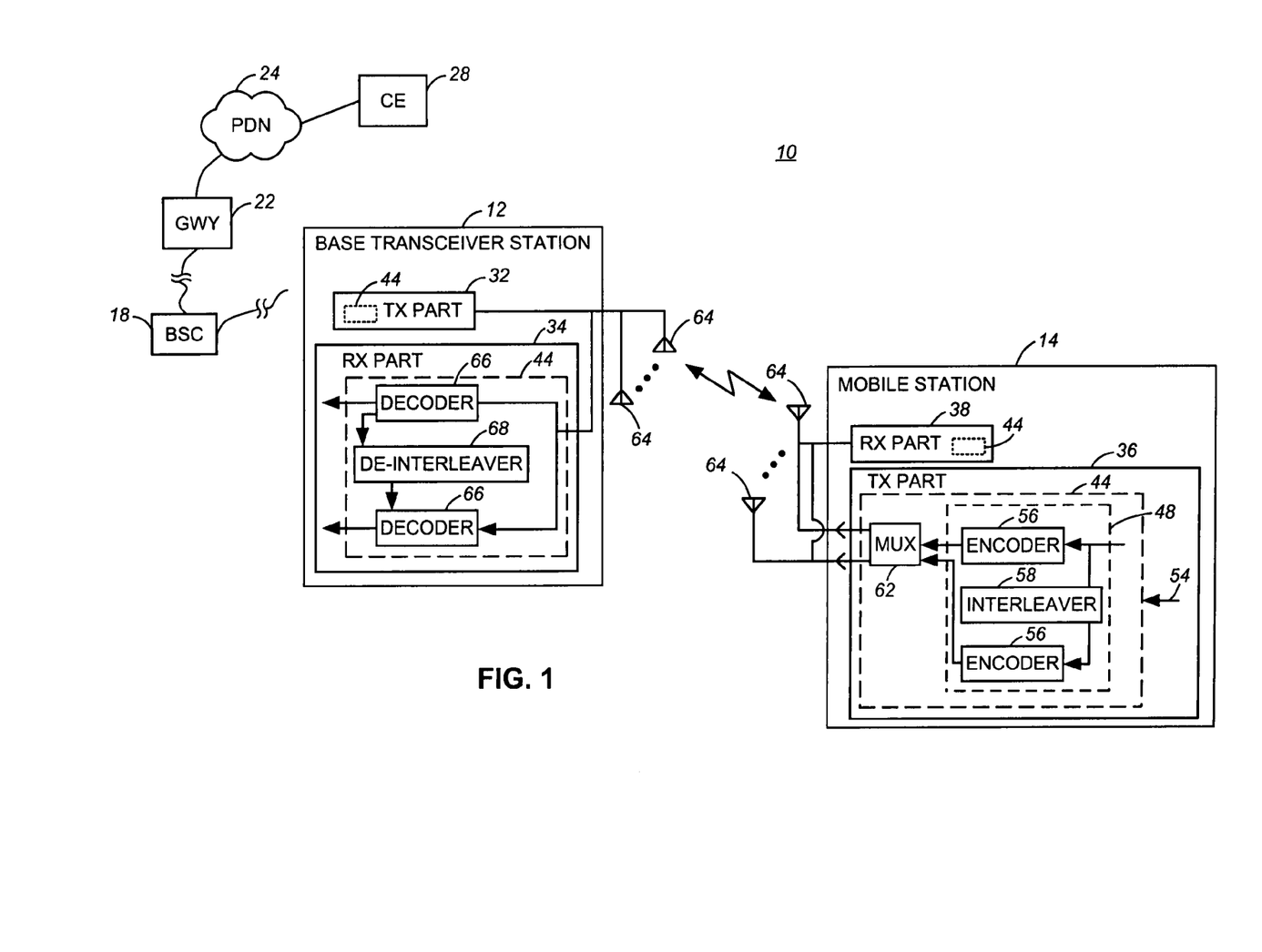
FIG. 1 illustrates a functional block diagram of a communication system in which an embodiment of the present invention is operable.

Referring first to FIG. 1, a radio communication system, shown generally at 10, provides for the communication of data by way of radio channels defined upon radio links extending between sets of communication stations involved in a communication session by which to effectuate a communication service.

In the exemplary implementation, the communication system forms a cellular communication system that provides for high data rate communication services. More particularly, in the exemplary implementation, the communication system forms a cellular communication system operable generally pursuant to the operational specification that sets forth the operating parameters and protocols of a CDMA 2000 system that provides for 1xEV-DV data services.

While the following description shall describe exemplary operation of the communication system with respect to its implementation as a CDMA 2000-compliant cellular communication system that provides for 1xEV-DV communication services, description of operation of the communication system, as well as an embodiment of the present invention operable therein, can analogously be described with respect to an implementation in which the cellular communication system is operable pursuant to another operating standard or forms another type of radio communication system. For instance, the communication system is also representative of cellular communication systems operable pursuant to a GSM (Global System for Mobile communications) operating specification that provides for GPRS (General Packet Radio Service) or EDGE (Enhanced Data for GSM Evolution) data services, as well as other cellular operating specifications, and other types of radio communication systems. Description of operation of an embodiment of the present invention can analogously be described with respect to its implementation in such other communication system.

While the communication system forms a multi-user communication system, two communication stations are shown in FIG. 1 for purposes of illustration. A first communication station 12 forms a radio base station, i.e., a base transceiver station, that forms part of the network part of the communication system. And, a second communication station forms a mobile station. The base transceiver station and the mobile station communicate by way of radio channels defined upon a radio air interface extending between the base transceiver and mobile stations 12 and 14. The following description shall describe exemplary operation of an embodiment of the present invention with respect to communication of data originated at the mobile station for communication to the base transceiver station. Analogous description of operation of an embodiment of the present invention in which data originated at the base transciever station for communication to the mobile station can also be made.

The network part of the communication system, of which the base transceiver station forms a portion, also includes a base station controller (BSC) 18. The base station controller is coupled to a group of base transceiver stations, here represented by a single base station, i.e., the base transceiver station 12. The base station controller operates, amongst other things, to control operation of the base transceiver stations to which the base station controller is coupled. In turn, the base station controller is coupled to a radio gateway (GWY) 22. The gateway forms a gateway to, and from, other portions of the network part of the communication system. Here, the gateway is coupled to a packet data network (PDN) 24, such as the Internet backbone, or the like. A correspondent entity (CE) 26 is coupled to the packet data network 24. The correspondent entity is representative of a data source or data sink that originates, or terminates, data communicated during operation of the radio communication system. The correspondent entity forms, for instance, a computer server that sources data that is to be communicated to the mobile station, a telephonic station, or the like.

During operation of the communication system, two-way communication of data between the base transceiver station and the mobile station is permitted. Data originated at the network part of the communication system is communicated upon forward link channels defined upon forward links of the radio air interface to the mobile station. And, data originated at the mobile station for communication to the network part is communicated upon reverse link channels defined upon reverse links of the radio air interface.

To effectuate the two-way communication of data, the base transceiver station and the mobile station each include radio transceiver circuitry capable of transceiving data containing communication signals. The base transceiver station, accordingly, includes a transmit part 32 and a receive 34. Analogously, the mobile station includes a transmit part 36 and a receive part 38. Data communicated upon forward link channels is sent thereon by the transmit part 32 of the base transceiver station, and the transmitted, forward link data is received and operated upon by the receive part 38 of the mobile station. Data communicated upon reverse link channels, originated by the mobile station, is sent by the transmit part 36, and the receive part 34 of the base transceiver station detects and operates upon the reverse link data.

As noted previously, distortion, such as that due to fading conditions, might be introduced upon data communicated between the base transceiver station and mobile station during operation of the communication system. To compensate for the distortion, transmit diversity is used to increase the diversity of the transmitted data. Fading conditions on the communication channels upon which the data is communicated is, typically, time-varying. Due to the time-varying nature of the fading conditions, the distortion of the transmitted data is typically not constant but, instead, varies as a function of time. Conventional diversity schemes and mechanisms that do not take into account the time-varying nature of the fading conditions are therefore sometimes unable adequately to compensate for the fading or inefficiently communicate the data due to the introduction diversity of levels greater than necessary.

Pursuant to an embodiment of the present invention, the base transceiver station and the mobile station each include apparatus 44 of an embodiment of the present invention. The elements of the apparatus are functionally represented in the Figure. The functions performed by the various elements are implemented in any desired manner, such as by algorithms executable by processing circuitry. Operation of an embodiment of the present invention shall be described with respect to the apparatus 44 embodied at the transmit part of the mobile station and at the receive part of the base transceiver station. Operation of the apparatus embodied at the receive part of the mobile station and at the transmit part of the base transceiver station is analogous.

The apparatus 44 embodied at the transmit part of the base transceiver station includes an encoder to which data that is to be communicated is applied, here by way of the line 52. A line 54 also extends to the encoder 48. The line 54 is representative of application of indications of channel conditions upon the channels defined on the radio air interface or of commands generated as a result of analysis of the channel conditions. Responsive to the values applied to the encoder, the amount of diversity introduced upon the data that is to be communicated by the mobile station is selected. When channel conditions are poor, increased levels of diversity are provided. And, when channel conditions are not poor, decreased levels of diversity are utilized. In the exemplary implementation, both time and spatial diversity is at least selectably provided to overcome the effects of propagation disturbances of the data transmitted by the transmit part of the mobile station. As communication conditions change, values generated on the line 54 correspondingly change, and the levels of diversity caused to be introduced upon the data communicated by the base transceiver station also changes.

Here, the encoder includes constituent encoder elements 56 and one or more interleavers 58. The constituent encoder elements are selectably operable together with operation of a corresponding interleaver element 58 to encode data applied thereto to form encoded representations thereof.

The apparatus further includes a multiplexer 62 to which the encoded representations are applied. The multiplexer, in turn, is coupled to transmit antenna transducers 64 that transduce the data applied thereto into electromagnetic form for communication upon reverse link channels to the base transceiver station.

The receive part 34 of the base transceiver station includes a decoder selectably operable in manners corresponding to, but reverse to that of, operation of the encoder 48. Corresponding to the encoder 48, the decoder includes constituent decoder elements 66 and one or more deinterleavers 68. Decoded data decoded by the decoder 64 is provided to other portions of the receive part 34, thereat to recover the informational content of the data. Indications are also provided to the decoder 64 to alert the decoder of the manner by which the encoder 48 operates; thereby to be configured to operate in manners generally reverse to that of manners by which the encoder encodes the data applied thereto.

Figure 2:
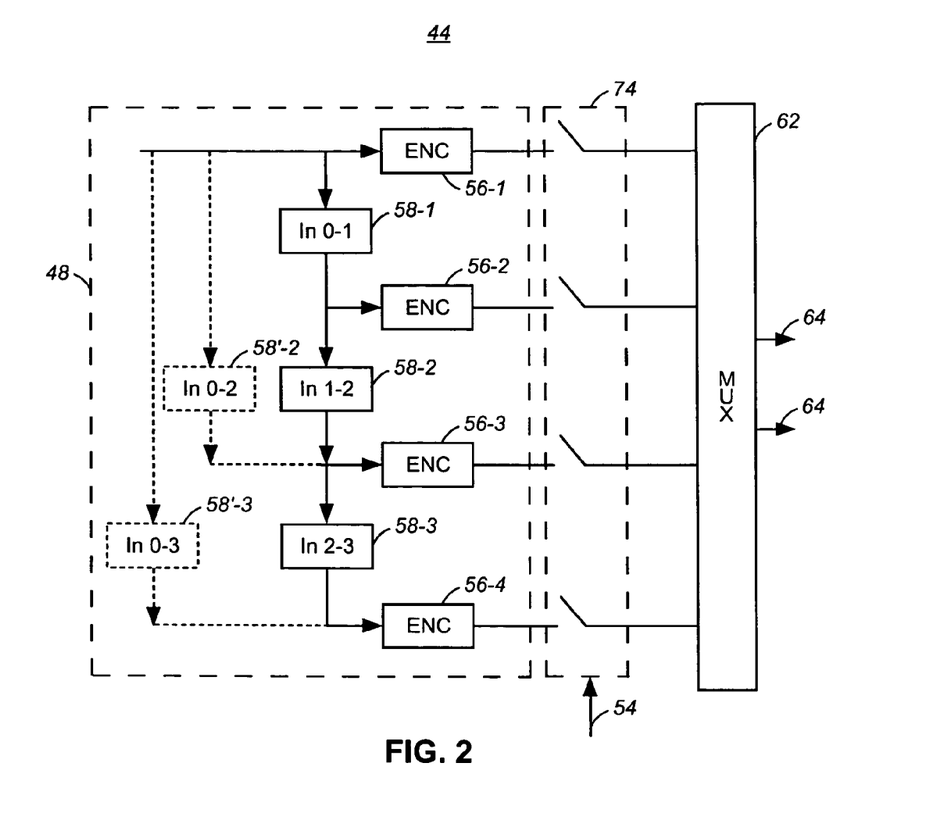
FIG. 2 illustrates a functional block diagram of encoder apparatus that forms a portion of the communication system shown in FIG. 1.

FIG. 2 illustrates part of the apparatus 44, namely, the part of the apparatus embodied at the transmit part 36 of the mobile station. The encoder 48, multiplexer 62, and antennas 64 are again illustrated. The encoder is here shown to include n, here where n=4, constituent encoder elements 56, and n−1 interleaver elements are cascaded, and associated with a corresponding n−1 constituent encoder elements. An alternate arrangement of the interleaver elements 58, indicated by 58', is shown in dash in the Figure.

The constituent encoder elements are coupled by way of a switch element 74 to the multiplexer 62. Positioning of the functional switches of the switch element are dependent upon the values formed upon the line 54. When increased diversity is required, increased constituent encoder elements are connected so that additional encoding performed by the constituent encoder elements is utilized. The values generated on the line 54 are also determinative of operation of the multiplexer 62.

Depending upon the positioning of the switch elements of the switch 74 and the operation of the multiplexer, dual, or other, antennas are utilized, or only a single transmit antenna is utilized. Increased transmit diversity, when needed to overcome channel impairments, is further provided through the encoding performed by the constituent encoder elements. Uncorrelation of transmit paths defined by the separate antennas is not assumed; instead, use of the different turbo code interleavers prior to associated constituent encoder elements provides additional decorrelation beyond that provided by the spatial/polarization diversity provided by the transmit antennas.

The original information, i.e., the data to be communicated and applied to the apparatus 44 by way of the line 52, is referred, with respect to the Figure, as level 0 information. The interleaver elements J-K, e.g., 0-1, 1-2, and 2-3, each denote turbo interleavers that take data from a level J and interleave the data for coding at level K. In the exemplary implementation, in single output transmission, i.e., transmissions, using a single transmit antenna, only the top (as shown) interleaver element In (0-1) 58, is utilized. In the exemplary configuration, the interleaver elements interleave data from a prior level. In the alternate implementation shown in dash, the interleaver elements interleave the original level 0 information. Once interleaved, the interleaved data is provided to the associated encoder elements that, in the exemplary implementation, operate pursuant to simple recursive codes, such as those described in the physical layer standard for CDMA 2000, spread spectrum system, release C.

The multiplexer 62 operates to select which data is provided to the transmit antennas. In one implementation, the multiplexer further punctures code bits. And, in the exemplary implementation, the top most (as shown) transmit antenna receives code bits formed by the top two (also as shown) constituent encoder elements while the second antenna transducer receives code bits generated by the bottom most (as shown) two encoder elements.

Figure 3:
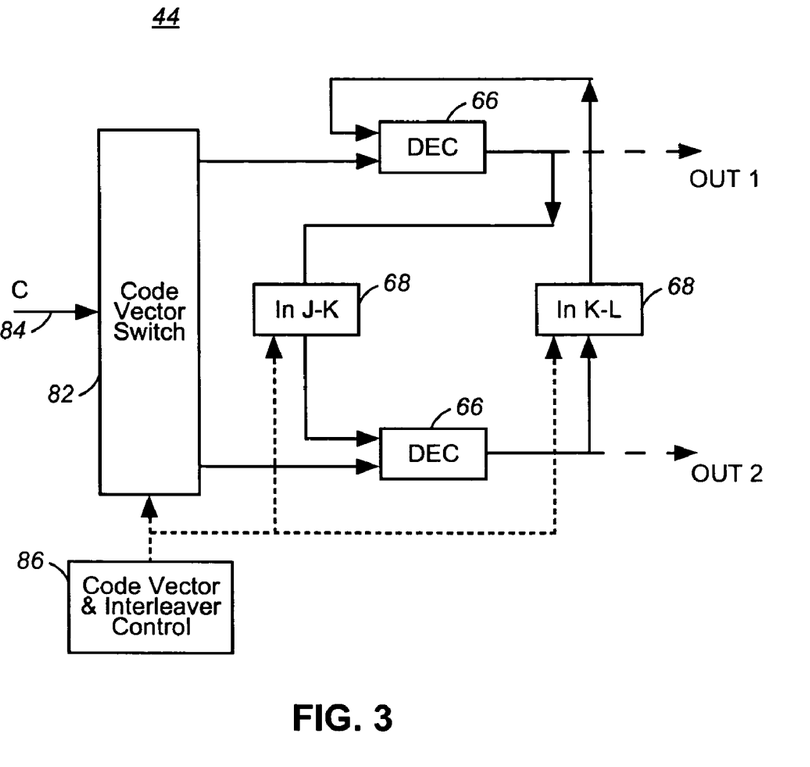
FIG. 3 illustrates a functional block diagram of decoder apparatus that also forms a portion of the communication system shown in FIG. 1.

FIG. 3 illustrates a portion of the apparatus 44 embodied at a receiving station, such as at the receive part of the base transceiver station. A decoder is again represented, here including, again, constituent encoder elements 66 and deinterleaver elements 68. Additionally, a code vector switch 82 is represented that passes coded data, here represented on the line 84, to the respective constituent decoder elements. A code vector and interleaver control element 86 is also represented in the Figure.

The constituent decoder elements decode the component code applied thereto by way of the code vector switch to constituently decode the data. When signal transmission signaling is utilized, a single deinterleaver element, deinterleaver element 1-0 is used. In another example, a code based on diversity transmission is decoded, e.g., by an interleaver sequence: In(0-1), In(1-2), In(2-3), In(3-0), In(0-1) . . . .

The constituent decoder elements decode the component code values provided thereto to form bit probability estimates. Extrinsic information passed on by a prior decoder, when available, is also used by the constituent decoder elements. The decoder element is typically designed to make probability estimates of information that has been encoded by a component encoder. In one implementation, the code vector switch also depunctures code vectors corresponding to the code bits that are punctured into the code bits at the sending station.

Figure 4:
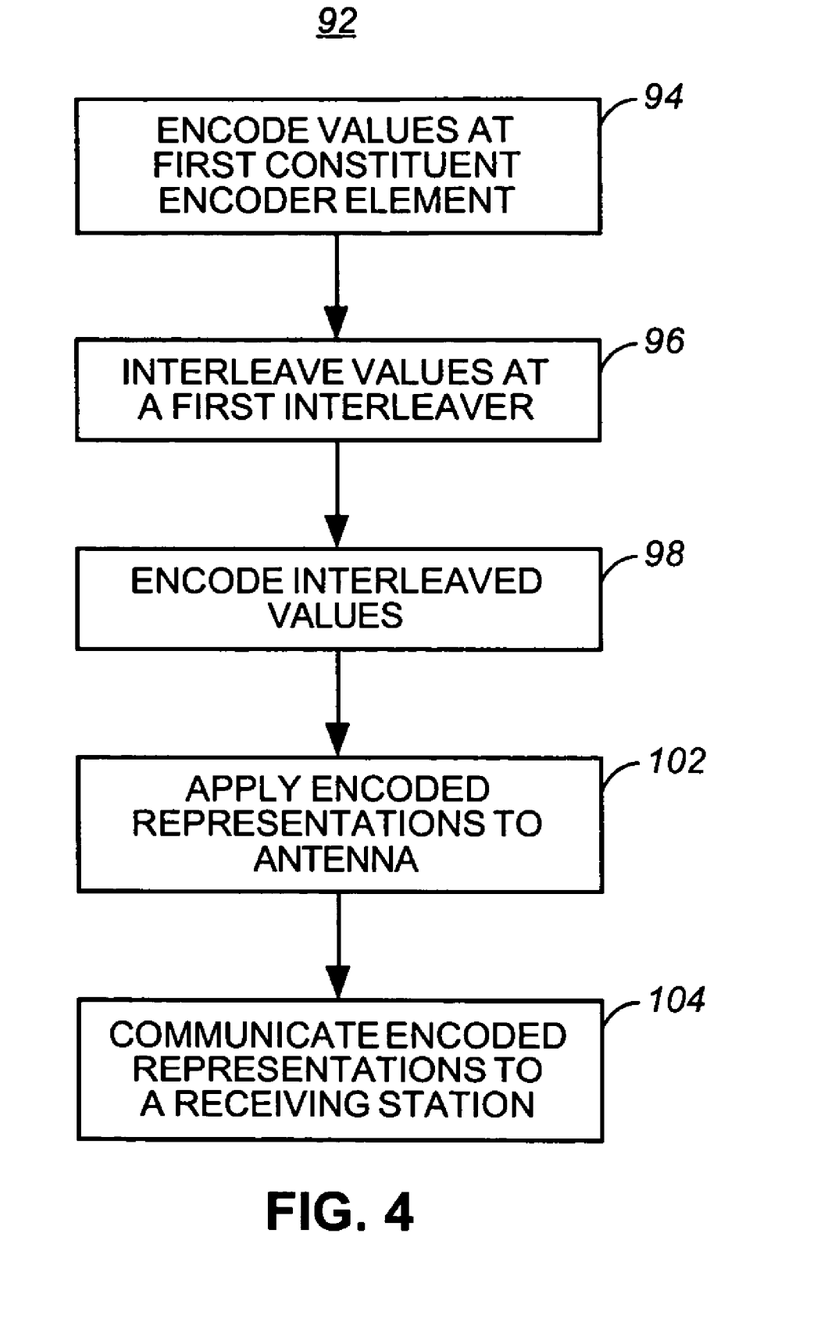
FIG. 4 illustrates a method flow diagram that lists the method steps of the method of operation of an embodiment of the present invention.

FIG. 4 illustrates a method, shown generally at 92, of the method of operation of an embodiment of the present invention. The method facilitates successful communication of data to a receiving station in a form to facilitate recreation of the informational content thereof.

First, and as indicated by the block 94, values representative of the data to be communicated by the sending station are encoded at a first constituent encoder'to form first encoded representations of the data. Then, and as indicated by the block 96, values representative of the data to be communicated by the sending station are interleaved at a first interleaver to form at least first interleaved values.

Thereafter, and as indicated by the block 98, the at least the first interleaved values are encoded to form second encoded representations of the data. And, as indicated by the block 102, the first encoded representations are applied to at least a first antenna transducer to be transduced therefrom.

Subsequently, and as indicated by the block 104, the data is communicated upon a radio channel to a receiving station to be operated upon thereat.

As communication conditions change, the number of encoding operations and corresponding interleaving operations are altered, as needed. When communication conditions deteriorate, descreased levels of diversity are utilized to combat the effects of poor channel conditions. And, when communication conditions improve, the amount of diversity introduced upon the data is reduced, thereby to increase throughput.

The previous descriptions are of preferred examples for implementing the invention, and the scope of the invention should not necessarily be limited by this description. The scope of the present invention is defined by the following claims.

We claim:

1. Apparatus for a sending station that communicates data upon a channel susceptible to distortion, said apparatus for facilitating successful communication of the data in a form to facilitate recreation of the informational content thereof, said apparatus comprising:

a first constituent encoder adapted to receive values representative of the data to be communicated by the sending station, said first encoder for encoding the values received thereat to form first encoded representations of the data;

at least a first interleaver adapted to receive the values representative of the data to be communicated by the sending station, said first interleaver for interleaving the values received thereat to form at least first interleaved values;

at least a second constituent encoder adapted to receive the at least the first interleaved values formed by said at least the first interleaver, said second constituent encoder for encoding the at least the first interleaved values to form second encoded representations of the data, the second encoded representations decorrelated from the first encoded representations responsive to interleaving performed by said first interleaver;

a multiplexer adapted to concurrently receive at least two representations of the data, the two representations of data comprising at least one of the first encoded representations of the data and at least one of the second encoded representations of the data, the at least two representations of the data being selectably multiplexed together, respectively, selection made dynamically responsive to distortion communication conditions on the channel susceptible to distortion; and at least a first antenna transducer adapted to receive the selectably multiplexed representations of the data.

2. The apparatus of claim 1 wherein said first constituent encoder comprises a first recursive encoder.

3. The apparatus of claim 2 wherein said second constituent encoder comprises a second recursive encoder, the second recursive encoder and the first recursive encoder operable pursuant to correspondent recursive codes.

4. The apparatus of claim 1 wherein said at least the second constituent encoder comprises a recursive encoder.

5. The apparatus of claim 1 wherein said first interleaver interleaves the values received thereat to a first interleaving level.

6. The apparatus of claim 1 wherein said at least the second constituent encoder comprises the second constituent encoder and at least a third constituent encoder, the third constituent encoder for forming third encoded representations of the data.

7. The apparatus of claim 6 wherein said at least the first interleaver comprises the first interleaver and at least a second interleaver, said second interleaver adapted to receive the first interleaved values formed by the first interleaver, said second interleaver for interleaving the values received thereat to form second interleaved values.

8. The apparatus of claim 7 wherein said third constituent encoder is adapted to receive the second interleaved values and wherein the third encoded representations are formed responsive thereto.

9. The apparatus of claim 6 wherein said at least the first interleaver comprises the first interleaver and at least a second interleaver, said second interleaver adapted to receive the values representative of the data to be communicated by the sending station, said second interleaver for interleaving the values received thereat to form second interleaved values.

10. The apparatus of claim 1 wherein said at least the first antenna transducer comprises the first antenna transducer and at least a second antenna transducer, the first and at least second antenna transducers separated by a selected separation distance, the second antenna transducer adapted to receive a selected one of the first representation of the data, the at least one of the second encoded representations of the data, and an encoded representation of the data comprising the first and the at least one of the second encoded representations of the data selectably multiplexed together, respectively.

11. The apparatus of claim 10 further comprising a connector for selectably connecting said first and at least second constituent encoders, respectively, at which the first and at least one of the second encoded representations are formed to the first and second selected ones of the first and at least second antenna transducers.

12. The apparatus of claim 11 wherein said connector further comprises a data puncturer for selectably puncturing the first and at least one of the second encoded representations that are selectably applied to the first and at least second antenna transducers.

13. The apparatus of claim 1 wherein the data is communicated to a receiving station subsequent to communication thereof upon the channel, said apparatus further comprising:
- a first constituent decoder adapted to receive representations of data received at the receiving station, said first constituent decoder for decoding the representations of the data received thereat to form first decoded data values therefrom;
- at least a first deinterleaver adapted to receive the first decoded values formed by said first constituent decoder, said first deinterleaver for deinterleaving the first decoded values to form first deinterleaved values therefrom; and
- at least a second constituent decoder selectably adapted to receive representations of the data received at the receiving station and first deinterleaved values formed by said first deinterleaver, said second constituent decoder for forming second decoded data values therefrom.

14. The apparatus of claim 13 wherein said first constituent decoder is further adapted to receive the second decoded values and wherein the first decoded values are recursively formed further responsive to the second decoded values.

15. The apparatus of claim 13 wherein the first decoded data values and the at least the second decoded data values comprise probability estimates.

16. A method for communicating in a radio communication system in which data is communicated by a sending station upon a channel susceptible to distortion, said method for facilitating successful communication of the data to a receiving station in a form to facilitate recreation of the informational content thereof, said method comprising:
- encoding values representative of the data to be communicated by the sending station at a first constituent encoder to form first encoded representations of the data;
- interleaving values representative of the data to be communicated by the sending station at a first interleaver to form at least first interleaved values;
- encoding the at least the first interleaved values to form second encoded representations of the data, the second encoded representations decorrelated from the first encoded representations responsive to interleaving performed during said operation of interleaving;
- applying concurrently to a multiplexer at least two representations of the data, the two representations of the data comprising at least one of the first encoded representations of the data and at least one of the second encoded representations of the data, the at least two representations of the data being selectably multiplexed together, respectively; and
- applying to at least a first antenna transducer the selectably multiplexed representations of the data, the applying of representations of data to the transducer dynamically responsive to the distortion communication conditions on the channel susceptible to distortion.

17. The method of claim 16 wherein the at least the first antenna transducer to which the representations are applied during said operation of applying comprise the first antenna transducer and at least a second antenna transducer.

18. The method of claim 16 further comprising the operations of: sending the data to the receiving station; and decoding the data received thereat.

* * * * *